United States Patent
Almkvist et al.

(10) Patent No.: US 9,719,438 B2
(45) Date of Patent: Aug. 1, 2017

(54) TURBOCHARGER

(71) Applicant: VOLVO CAR CORPORATION, Gothenburg (SE)

(72) Inventors: Goran Almkvist, Lerum (SE); Jonas J. Bjorkholtz, Karna (SE); Erik Lindgren, Gothenburg (SE)

(73) Assignee: VOLVO CAR CORPORATION (SE)

( * ) Notice: Subject to any disclaimer, the term of this patent is extended or adjusted under 35 U.S.C. 154(b) by 77 days.

(21) Appl. No.: 14/746,390

(22) Filed: Jun. 22, 2015

(65) Prior Publication Data
US 2015/0377157 A1 Dec. 31, 2015

(30) Foreign Application Priority Data

Jun. 27, 2014 (EP) .................................. 14174795

(51) Int. Cl.
| | | |
|---|---|---|
| F02B 33/44 | (2006.01) | |
| F02D 41/00 | (2006.01) | |
| F02D 41/10 | (2006.01) | |
| F02B 21/00 | (2006.01) | |
| F02B 37/02 | (2006.01) | |
| F02B 37/10 | (2006.01) | |
| F02B 37/14 | (2006.01) | |

(Continued)

(52) U.S. Cl.
CPC .......... *F02D 41/0007* (2013.01); *F02B 21/00* (2013.01); *F02B 29/02* (2013.01); *F02B 37/02* (2013.01); *F02B 37/10* (2013.01); *F02B 37/14* (2013.01); *F02B 37/20* (2013.01); *F02D 41/10* (2013.01); *F02D 2200/602* (2013.01); *F02N 2200/101* (2013.01); *Y02T 10/144* (2013.01)

(58) Field of Classification Search
CPC .......... F02B 21/00; F02B 29/02; F02B 37/02; F02B 37/10; F02B 37/14; F02B 37/20; F02D 2200/602; F02D 41/0007; F02D 41/10; F02N 2200/101; Y02T 10/144

See application file for complete search history.

(56) References Cited

U.S. PATENT DOCUMENTS

| 4,481,773 A | 11/1984 | Sugito et al. |
| 4,674,283 A | 6/1987 | Ishida et al. |
| 5,630,395 A | 5/1997 | Katoh et al. |

(Continued)

FOREIGN PATENT DOCUMENTS

| DE | 19833134 C1 | 11/1999 |
| DE | 102006027865 A1 | 12/2007 |

(Continued)

OTHER PUBLICATIONS

Extended European Search Report Dated Jan. 22, 2015, Application No. 14174795.6-1606, Applicant Volvo Car Corporation, 5 Pages.

(Continued)

*Primary Examiner* — Jesse Bogue
(74) *Attorney, Agent, or Firm* — Brooks Kushman P.C.

(57) ABSTRACT

A turbocharger system for a vehicle comprising a turbocharger, a tank for compressed gas and an exhaust manifold conduit in fluid communication with an inlet of the turbocharger. The tank is in fluid communication with the manifold conduit and is arranged and controlled to push compressed gas into the manifold conduit during a predetermined pulse duration time period for initial compressor spin up in the turbocharger.

19 Claims, 4 Drawing Sheets

(51) Int. Cl.
F02B 37/20 (2006.01)
F02B 29/02 (2006.01)

(56) References Cited

U.S. PATENT DOCUMENTS

| | | |
|---|---|---|
| 6,328,003 B1 | 12/2001 | Gaertner et al. |
| 8,387,382 B1 | 3/2013 | Dunn |
| 8,652,007 B2 | 2/2014 | Kato et al. |
| 9,322,322 B2 | 4/2016 | Almkvist et al. |
| 2002/0100278 A1 | 8/2002 | He et al. |
| 2005/0109316 A1* | 5/2005 | Oda .................. F02D 19/081 123/406.29 |
| 2010/0086414 A1 | 4/2010 | Tai |
| 2010/0139266 A1 | 6/2010 | Gerum |
| 2010/0331143 A1* | 12/2010 | Jager ..................... B60W 10/02 477/167 |
| 2011/0014067 A1 | 1/2011 | Mayr |
| 2011/0288715 A1* | 11/2011 | Schaffeld ................ F02B 21/00 701/31.4 |
| 2012/0216532 A1* | 8/2012 | Schaffeld ................ F02B 21/00 60/611 |
| 2012/0240909 A1 | 9/2012 | Geyer |
| 2013/0305716 A1 | 11/2013 | Rollinger et al. |
| 2014/0026538 A1 | 1/2014 | Hauser et al. |
| 2014/0158099 A1* | 6/2014 | Asmis ..................... F02B 29/02 123/568.15 |
| 2014/0182286 A1* | 7/2014 | Almkvist ................ F02B 37/02 60/606 |
| 2015/0377157 A1 | 12/2015 | Almkvist et al. |

FOREIGN PATENT DOCUMENTS

| | | |
|---|---|---|
| DE | 102007059145 A1 | 6/2009 |
| DE | 102010053057 A1 | 6/2012 |
| EP | 0531277 A2 | 3/1993 |
| EP | 1908937 A1 | 4/2008 |
| EP | 2184463 A1 | 5/2010 |
| EP | 2667006 A1 | 11/2013 |
| EP | 2749751 A1 | 7/2014 |
| FR | 2836161 A1 | 8/2003 |
| FR | 2916238 A1 | 11/2008 |
| GB | 2121474 A | 12/1983 |
| JP | 2012184738 A | 9/2012 |
| WO | 2010067447 A1 | 6/2010 |
| WO | 2014092578 A1 | 6/2014 |

OTHER PUBLICATIONS

Extended European Search Report Dated Apr. 29, 2013, Application No. 12199687.0-1603, Applicant Volvo Car Corporation, 5 Pages.

U.S. Non-Final Office Action Dated Mar. 17, 2015, U.S. Appl. No. 14/138,985.

U.S. Final Office Action Dated Jul. 6, 2015, U.S. Appl. No. 14/138,985.

U.S. Notice of Allowance Dated Jan. 20, 2016, U.S. Appl. No. 14/138,985.

U.S. Corrected Notice of Allowance Dated Feb. 18, 2016, U.S. Appl. No. 14/138,985.

* cited by examiner

TURBOCHARGER

CROSS-REFERENCE TO RELATED APPLICATIONS

This application claims foreign priority benefits under 35 U.S.C. §119(a)-(d) to European patent application number EP 14174795.6, filed Jun. 27, 2014, which is incorporated by reference in its entirety.

TECHNICAL FIELD

The disclosure relates to a turbocharger system for a vehicle and a method for controlling the system.

BACKGROUND

In vehicles of today it is common to use an exhaust driven turbocharger for compressing air to an inlet manifold of an engine. The turbocharger revs up dependent on the exhaust flow, which in turn is dependent on engine speed and engine torque. Hence, turbocharger response is a well-known problem with turbocharger engines at low engine speeds. This problem becomes worse with the new technologies to reduce $CO_2$, downspeeding and downsizing with increased boost due to the fact that it needs more energy to build up the higher boost pressure. The response problem is a limiting factor in $CO_2$ reduction especially in real world driving due to that an acceptable drivability of the vehicle needs an amount of power margin to handle instant power demands without need of gear shifting, The instant power demands may be from road inclination, small accelerations, accessories, etc.

It is known to use various compressors connected to the inlet manifold for response assistance by feeding air to the inlet side before the turbocharger has revved up. The mechanical compressor is complex, expensive, has low durability, NVH (Noise, Vibrations, Harshness) problems, difficult to control and is noisy.

There is thus a need to find a solution that is cost efficient, durable, produces low noise and improved response.

SUMMARY

An object of the disclosure is to remedy the problems described with prior art by improving turbocharger response, which according to the disclosure may be done by controlling initial compressor spin up by pushing compressed gases from a tank into an exhaust manifold or a manifold conduit connected to the exhaust manifold and the turbocharger inlet.

The disclosure relates to a turbocharger system for a vehicle. The system comprises a turbocharger, a tank for compressed gas and an exhaust manifold conduit being in fluid communication with an inlet of the turbocharger. The tank is in fluid communication with the manifold conduit and the tank is arranged to push a pulse of compressed gas into the manifold conduit during a predetermined pulse duration time period for initial compressor spin up in the turbocharger. The system comprises a first control unit and a load sensor connected to the first control unit. The load sensor is arranged to sense a desired engine load from a driver of the vehicle. The first control unit is arranged to estimate a desired change in engine load dependent on received input from the load sensor. The first control unit is arranged to estimate a desired turbocharger effect being dependent on the estimated desired change in engine load. The first control unit is arranged to control the tank to discharge a predetermined pulse of compressed air dependent on the estimated desired turbocharger effect.

If the tank is very large and/or the air pressure high compared to the size of the turbocharger, then the tank need not be fully emptied in order to rev up the turbocharger to a maximum RPM. Furthermore, it is the desired turbocharger effect that dictates the pulse length dependent on pressure suitable for giving that effect. However, it is possible to optimize tank size and pressure that gives a pulse that makes it possible to rev up the turbocharger from zero to maximum such that the tank becomes empty after such a pulse. Other alternatives are possible for designing the tank. It should be noted that a small tank has the advantage of being light weight but needs to be refilled often, while a large tank has the advantage of less need for refill but it is also heavy. If the pressure in the tank is high it has the advantage of less need for refill, but the high pressure puts high demands on the effect and power of the charging unit.

The driver is either a human being or an automated driver system, or a combination of a driver and a semi-automated driver system.

According to one example, the load sensor is arranged to sense position of an accelerator pedal. The predetermined position of the pedal corresponds to a desired engine load and the change in position corresponds to a desired change in engine load estimated by the first control unit.

According to one example, the load sensor is arranged to sense the accelerator pedal angle and/or accelerator pedal derivative. The first control unit is then arranged to control the tank to discharge the predetermined pulse of compressed air depending on accelerator pedal angle and/or accelerator pedal derivative. The accelerator pedal may be moved from one position to another within a first predetermined range of speed, i.e., an accelerator pedal derivative, corresponding to a normal behavior and may be moved from one position to another within a second predetermined range of speed, i.e., an accelerator pedal derivative, corresponding to a non-normal behavior.

The first control unit estimates a desired turbocharger effect being dependent on the estimated desired change in engine load, and the higher the estimated desired turbocharger effect, the higher the pulse effect. The pulse effect is dependent on tank pressure and pulse length and dependent on the tank volume and tank pressure the pulse effect needed relates to a portion of the maximum pulse effect or the maximum possible pulse effect. Hence, the higher accelerator pedal angle gives a larger portion than a lower angle.

The accelerator pedal may be moved from one position to another within the second predetermined range of speed, i.e., an accelerator pedal derivative, corresponding to an increased demand for engine load compared to the normal behavior. The first control unit then estimates a desired turbocharger effect being dependent on the estimated desired change in engine load, and the higher the estimated desired turbocharger effect, the higher the pulse effect. As been stated above, the pulse effect is dependent on tank pressure and pulse length and dependent on the tank volume and tank pressure the pulse effect needed relates to a portion of the maximum pulse effect or the maximum possible pulse effect. The load sensor is in the example arranged to sense movement of an accelerator pedal, wherein a predetermined rate of change in movement, i.e., pedal derivative, of the pedal correspond to a desired engine load estimated by the first control unit. Hence, a higher accelerator pedal derivative gives a larger portion, i.e., pulse effect, than a lower accelerator pedal derivative.

Should the load sensor sense a small change in accelerator pedal angle, but a high and above normal accelerator pedal derivative the first control unit may be arranged to estimate a higher desired change in engine load than compared to a normal accelerator pedal derivative.

Should the load sensor sense a large change in accelerator pedal angle, but a low or normal accelerator pedal derivative the first control unit may be arranged to estimate a higher desired change in engine load than compared to a normal accelerator pedal derivative.

Should the load sensor sense a large change in accelerator pedal angle and a high and above normal accelerator pedal derivative the first control unit may be arranged to estimate a higher desired change in engine load than compared to a normal behavior.

Hence, the first control unit is arranged to control the tank dependent on predetermined scenarios of estimated desired change in engine load.

The first control unit is arranged to control the tank to not push compressed gas into the manifold conduit when there is no or low estimated desired change in engine load. The low estimated desired change in engine load corresponding to the turbocharger being not engaged or not further engaged. This may be the case when the engine operates within the suction envelope, for example during steady state or a very small change of desired increase of engine load.

The predetermined scenarios of estimated engine load is a design parameter depending on, for example, the desired behavior of the vehicle. It could be a race car feeling with maximum power for small changes in pedal movement or derivatives. It could be a function of a desire to have an engine with low energy consumption. There are numerous scenarios that could be in play and it is up to the designer to tune the engine, but below is an example of a scenario scheme that applies to the disclosure.

The estimated desired change in engine load goes from no or low load to medium high estimated load. The first control unit is arranged to control the tank to push a first subset of the compressed gas into the manifold conduit. The first subset corresponds to the predetermined pulse of compressed air being discharged giving the estimated desired turbocharger effect.

The estimated desired change in engine load goes from no or low load to high estimated load. The first control unit is arranged to control the tank to push a second subset of the compressed gas into the manifold conduit. The second subset corresponds to the predetermined pulse of compressed air being discharged giving the estimated desired turbocharger effect.

The estimated desired change in engine load goes from medium high to high. The first control unit is arranged to control the tank to push a third subset of the compressed gas into the manifold conduit. The third subset corresponds to the predetermined pulse of compressed air being discharged giving the estimated desired turbocharger effect.

The estimated desired change in engine load goes from any value below a predetermined threshold value to the threshold value. The threshold value being set as a value below a maximum value of engine load or to the maximum value of the engine load. The first control unit is arranged to control the tank to push a fourth subset of the compressed gas into the manifold conduit. The fourth subset corresponds to the predetermined pulse of compressed air being discharged giving the estimated desired turbocharger effect.

The fourth subset is equal to or greater than the third subset; and the third subset is equal to or greater than the second subset; and the second subset is equal to or greater than the first subset.

The fourth subset corresponds to a predetermined pulse of compressed air being discharged giving a maximum turbocharger effect; and the first, second and third subsets each correspond to a predetermined pulse effect of compressed air being discharged giving a turbocharger effect less than a maximum turbocharger effect.

The first control unit is arranged to exchange information with a gear sensor for sensing gear shift and/or gear position, wherein the first control unit is arranged to control the tank and pulse portion, i.e., pulse effect, dependent on gear shifting.

In one example, the first control unit is arranged to not push compressed gas into the manifold conduit when there is a downshift in gear. According to another example, the first control unit is arranged to push compressed gas into the manifold conduit when there is a downshift in gear in order to optimize downshift and corresponding demand on expediently revving up the engine. The pulse is synchronized with the downshift for optimum behavior according to chosen design parameters.

Power pulse could thus be used during transients to improve drivability, for example on medium and high loads where the driver without initial spin up of the turbocharger, would continue pushing the accelerator pedal for more engine load which could lead to a gear shift down on an automatic gear box due to poor engine response. Hence, controlling opening of the tank valve for a pushing a pulse of air for initial spin up and quicker engine response instead of a downshift enables a lower engine speed with same drivability and ultimately with lower fuel consumption.

According to one example, the first control unit is arranged to exchange information with an engine control unit in order to control the amount of fuel and air supplied to the engine. A demand for a higher engine load necessarily gives a higher demand for more fuel and/or more air.

In a prior art diesel engine or any other engine that uses an increased amount of oxygen during increased engine load the production of NOx becomes very high due to the necessity of a low lambda. Lambda is the Air-Fuel equivalence ratio, $\lambda$ (lambda), which refers to the ratio of actual Air-Fuel-Ratio to stoichiometry for a given mixture. $\lambda=1.0$ is at stoichiometry, rich mixtures $\lambda<1.0$, and lean mixtures $\lambda>1.0$. The use of the pulse and initial spin up of the turbocharger at lower loads and during accelerations reduces the amount of oxygen and at a smaller time window which reduces the time window and allows for a higher lambda and less NOx formation.

For a gasoline engine connected to an exhaust gas catalyst, the air/fuel equivalence ratio is diminished to a ratio below 1 when a scenario is detected for the tank to push compressed gas into the manifold conduit. The air/fuel equivalence ratio is advantageously between 0.7-0.9 during 0.8-1.2 s and starting, immediately before, directly or within 0.3 s from when the pulse is discharged. The reason for having a ratio below 1.1 is that the increased amount oxygen inserted in the exhaust gas need to be compensated for in the catalyst by running the engine on a rich fuel mix. The regeneration of the catalyst due to excess of oxygen is known per se in the field.

According to one example, the scenarios are detected by the first control unit. According to one example, the first control unit is connected to or comprises a memory of a suitable kind where the scenarios have been stored. The first control unit then collects information from sensors, for example the load sensor, in order to be able to calculate and estimate the desired change in engine load and the corresponding turbocharger effect. According to one example, the first control unit is connected to or comprises a computer able to make calculations from data provided by sensors and/or other computers and/or memories of suitable kind storing data. The first control unit then collects information in order for the computer to be able to calculate and estimate the desired change in engine load and the corresponding turbocharger effect.

The exhaust manifold may be connected to the manifold conduit or the manifold conduit may be a part of the exhaust manifold. The gas is pushed as a pulse during a time period being approximately 0.1-0.2 s dependent on a number of factors such as, for example, turbocharger size, pressure of the pulse, engine size of gas conduits and other factors that will be exemplified below. Both the power of the pulse and the time interval may vary dependent on desired engine and turbocharger behavior. Hence, the time period may be shorter than 0.1 s and longer than 0.2 s.

It is the power of the pulse that is crucial for the response, not the energy. According to one example of the disclosure 12 kW is added during 0.1 s to the exhaust manifold. This spins up the turbo typically during 0.1 s and after 0.2 s the engine produces all turbo energy. Recharge time for the tank is needed for full effect, but improved response is always available even if the tank is not fully loaded. The reason is that the turbo always spins up if the tank pressure is high enough to create a pulse that generates an increase in pressure in the exhaust manifold.

A major advantage with the disclosure is that it is possible to implement on any existing turbocharger system, by simply adding the tank system to the exhaust manifold or conduit.

The tank may be refilled by using a small compressor that may be driven by electricity or any other suitable means. Alternative refilling of the tank is possible, for example use of exhaust gas. The exhaust gas may be used to drive a compressor or may itself be the gas to be used in the tank. The use of exhaust gas for loading may be allocated to time periods during blowdown peaks. One option is to use a valve, preferably a reed valve that is controlled to open during blowdown peaks to at least partly fill the tank. Such a solution could charge the tank with approximately 1 bar higher than the average exhaust manifold back pressure. The valve could also be controlled to close when the pressure in the tank exceeds the exhaust gas counter pressure from the engine, typically in the region about 1-3 bar.

The recharge of the tank may be done by recapturing the initial exhaust manifold backpressure build up during a predetermined time, typically 0.5-2 sec. depending of the exhaust back pressure build up.

The opening time of the tank valve should also be optimized on several parameters, for example:
  Reducing exhaust contamination of valve and tank.
  Allocate possible opening when back pressure is higher than tank pressure.
  Increase system voltage to improve recharge time.
  Controlling the amount of turbo speed up by partly emptying the tank.
  History to detect non steady state conditions such as higher turbo speed caused by a recently acceleration.

Furthermore, it is an alternative to use the load pressure from a two-step turbocharger to at least partly refill the tank.

When introducing the compressed gas into the exhaust manifold or exhaust conduit, there is on a 4 cylinder engine always at least one exhaust valve open to one cylinder. The introduction of compressed gas affects the cylinder(s) associated with the open valve such that the engine revs up less than compared to if no gas would have been introduced. At the same time the introduction of gas revs up the turbocharger according to the disclosure. Should the compressed gas be cold air, the introduction of cold gas into the cylinder(s) would expand due to the heat in the engine which would further increase the pressure in the exhaust manifold and the exhaust conduit such that the turbocharger revs up even more than if the gas would have been hot.

The system comprises a tank valve connected to the tank for controlling the gas flow from the tank. The tank valve may be operated by an electrical, hydraulic or mechanical regulating means for opening and closing the valve. The tank valve may also be arranged to control the flow of gas to the tank, but as an alternative a second valve or opening could be connected to the tank for controlling the flow of gas to the tank. The system also comprises a second control unit for controlling the tank valve. The second control unit may be connected to a pulse regulation unit for regulating the pulse duration time period.

The second control unit is either connected to the first control unit or part of the first control unit. The first control unit transmits a control signal to the second control unit for controlling the pulse duration and the opening of the valve. The pulse duration depends on how long the valve is open and the pulse effect depends on how much air is released during the opening phase. If the valve is fully open, then a maximum effect is released for the time period; and if the valve is only partly open, then only a part of the maximum effect is released for the time period. Hence, if the valve is open a short time period but is fully open, then the pulse signature has a rapid increase in effect and an abrupt ending which dependent on the time period could take place before, on or after the pulse has reached maximum effect. However, if the valve is open a long time period but is fully open, then the pulse signature has a rapid increase in effect until it reaches its maximum and then fades out until the tank is empty. Should the valve be open only partly, the signature of the effect would have a less rapid increase, a lower maximum value, but would still fade out until the tank was empty. All these parameters are design parameters used by the engine designer in order to get a desired engine behavior.

Parameters that may control the tank valve:
  For example, throttle movement and/or throttle position. Here throttle could mean the accelerator pedal or should the engine comprise a carburetor, the throttle could mean the actual throttle positioned within the carburetor. However, most modern cars have fuel injection systems, which means, that the actual throttle position and movement is replaced with a value for the injection system, for example, dependent on accelerator pedal position.
  For example, turbocharger RPM, wherein the valve opening is closed when the turbocharger has an RPM (Rotation Per Minute) above a predetermine threshold. It is not necessary to measure RPM, but any substitute for evaluating the rotational speed could be used. Ambient conditions, road friction, vehicle speed, actual gear selected or shifting mode may be used to control the tank valve. It may also be possible to inhibit or delay the pulse at parking maneuvers and gear shift.

The disclosure is especially beneficial during take-off starts, i.e., when the vehicle is standing still or moving at low engine speeds and the driver makes a fast press down of the accelerator pedal indicating a wish to have a fast acceleration, and the turbocharger has not revved up enough to the give the engine the necessary air load to the inlet to create a turbo boost. The disclosure improves the take off in such a way that it may be comparable to a scenario with stalling start, i.e., when car stands still and the driver breaks and at the same time puts the gas on, so that the engine and turbocharger revs up before the take off.

The system comprises a tank pipe connected between the tank valve and the exhaust manifold or exhaust conduit. The volume and pressure of the tank contra diameter and length of the pipe are essential design parameters since the volume and pressure gives the energy and the pipe diameter acts as a choke for increasing or decreasing the possible amount of gas to be exerted during the pulse for a given volume and pressure.

A large turbocharger is an essential design parameter when downsizing an engine because a large turbocharger can produce more air flow and thereby gives a higher peak power of the engine. However, a large turbocharger has an increased problem with response compared to a smaller turbocharger, but with the disclosure the larger turbocharger revs up well before the engines enthalpy has revved up the turbo. Hence, the disclosure gives the advantage of eliminating the response problem with large turbochargers with high load pressure which in turn allows for downsizing engines, i.e., making the engine smaller and which in turn gives less fuel consumption.

The disclosure is highly advantageous at high altitude where the ambient air has a low pressure which gives a small amount of exhaust gas enthalpy which in turn inhibits the possibility for the turbocharger to rev up. With the present disclosure the introduction of compressed air to the exhaust manifold or exhaust conduit revs up the turbocharger which in turn compresses the ambient air to the engine which in turn is revved up in such a way that it produces exhaust gas to drive the turbocharger which has the benefit that the rev up may be comparable to that at low altitudes.

Furthermore, due to the quick response of the turbocharger it is possible to change gear shift schedule for down speeding, i.e., lower engine RPM but higher instant momentum is available which is an effect of faster rev up to high load pressure. The advantage is less ware and friction and thus less fuel consumption. The lower engine speed also emits lower noise increasing the interior and exterior comfort.

Another advantage of the disclosure is the quick response during start and stop, where the shut off engine needs extra-long time to rev up due to lower enthalpy caused by lower the engine speed and colder exhaust system during start phase Embodiments according to the disclosure will rev up the turbo similar to as if the engine was in idling mode.

Since the tank needs some time to be recharged there will be different rev up effects if a repeated acceleration is performed within the recharge time. After an acceleration using the disclosure, when the tank was fully or partly emptied, the turbocharger revs up and due to the mass momentum of the spinning compressor in the turbocharger the compressor will continue to spin with high RPM during several seconds. The high RPM of the turbocharger is beneficial during next start, and dependent on set valve tank parameters the opening of the tank valve may be inhibited should the turbocharger already spin with a speed above the predetermined threshold value. As an alternative to measuring the turbocharger rotational speed, it is possible to calculate turbocharger rotational speed after an initial pulse deceleration to determine pulse duration.

Cold start: It is possible to use the disclosure during cranking as soon as the engine or parts of the engine have fired. By introducing the compressed gas into the exhaust manifold or exhaust conduit, the turbocharger revs up and pushes compressed air fuel to the cylinders such that the known problem of low torque with low RPM during cold weather is avoided.

It is possible to use embodiments according to the disclosure on all vehicles independent on fuel choice, but when driving on gasoline and introducing air into the exhaust manifold or exhaust conduit it is advantageous to drive the engine below lambda 1 during a short period before, during and after the pulse. The reason is to compensate for the fact that oxygen may enter into the catalyst via the exhaust manifold or exhaust conduit, which may damage the catalyst function if too much oxygen is introduced to the catalyst.

According to one example of the disclosure it is possible to use the compressor and the tank in the air suspension system as a gas tank. In a normal car of medium size today, today a tank may hold 6 liters and 13 bar. The tank valve then is connected to the tank either directly or via a conduit.

Should the compressor and tank be separate units for the introduction of air into the exhaust manifold or exhaust conduit, other unit could be removed or eliminated in the design, for example the tire compressor can be eliminated for a spare.

A minor fuel consumption penalty exists from recharging. As an example, if recharge occurs once every 2.5 km the penalty is around approx. 0.3% if the extra load is added to the engine.

The tank may be a fire extinguisher type preferably made from stain resistive steel or aluminum. A tank drainage outlet is advantageously positioned at the bottom of the tank in order to drain water.

Charging of the tank by a small compressor typically 300 W:

The compressor could be placed in an engine compartment "cold zone" or in an air intake system for cooling. Typical recharge time may be 50% after 10 seconds and 90% after 25 seconds. The tank may be recharged by use of air from air filter or interior cabin for clean air.

The tank valve may be of a fast on/off type which is electrically controlled, or fast and slow in series or parallel to control pulse, or a combination with pneumatic chassis suspension, compressor and charge tank, or air pressure for brake system.

The system may comprise a check valve connected to the tank in order to assure that a pressure above a set value is released as a precaution.

The tank valve is connected to the exhaust manifold or exhaust conduit with a pipe of typically 15 mm diameter and which pipe is positioned upstream the turbocharger with reference to the exhaust gas flow direction. The exhaust gas flow direction is in a direction from the engine to the turbocharger.

The regulating means is controlled by the second control unit and typical tank release time is 0.1-0.2 sec. Control of engine power is done by the pressure pulse which is a function of valve opening duration time typically on/off with 50 ms steps.

Tank valve opening duration may be a function of one or more of pedal-position, -derivative, engine load and speed, coolant temperature, vehicle speed, gear, ambient temperature, altitude, gear shift, accessories on/off, condition in pressure tank.

Furthermore, the control function may also be a function of GPS position, driver behavior, etc.

The condition in the tank, such as change by heat up, cold/hot start, state of charge etc. may be detected by direct or indirect by using sensors such as pressure, temperatures. It may be possible to replace pressure gauge, temp sensor and safety valves with software functions.

If emission control is needed it is possible to compare the supplied oxygen during the pulse with the catalyst oxygen buffer, enriching air/fuel mix before and during pulse to restore catalyst buffer. It may also be possible to enrich the air/fuel mixture to handle initial knock on petrol engine and smoke limiter control to improve torque/emission control on diesel engines.

Diagnosis to detect fault or leakage I pulse system may be performed by adding or using existing sensors such as inlet pressures, temperature and lambda sensors.

Safety: 1 L at 15 bar contains approximately 2 kJ energy which corresponds to 0.7 g gun powder (3 kJ/g) which is comparable to a small fireworks banger.

According to one example of the disclosure, the following parameters are valid:

Compressed Air Pressure in the tank 6-10 bar,
Tank volume: 1-2 L,
12V Compressor around 200-400 W,
Pulse duration: 0.1-0.2 sec,
Dump valve/pipe diameter 10-15 mm,
Dump valve control: electric valve controlled by the second control unit,
Typical response are 0.4 bar boost pressure within 0.4 sec,
Recharge control by using the increasing back pressure to initial fill recharge time typically 10-20 s.

According to another example aiming to a more powerful response but a longer recharge time the following parameters are valid:

Compressed Air Pressure in the tank 10-15 bar,
Tank volume: 4-6 L,
12V Compressor around 400-600 W,
Pulse Duration: 0.1-0.3 sec,
Dump valve/pipe diameter 15-25 mm,
Dump valve control: electricvalve controlled by the second control unit,
Typical response are 1.4 bar boost pressure within 0.4 sec,
Recharge control by using the increasing back pressure to initial fill recharge time typical 30-60 s.

Yet another example:
2.0 L 5 cylinders Diesel engine a 2.3 L tank with 7.5 bar air pressure, and a 400 W electric compressor.
80% of the air tank is released during 0.1 s, the turbo speed increases 100000 rpm in 0.2 s.
Boost pressure is 0.5 bar after 0.3 s and the vehicle acceleration after 0.5 s is over 5 m/s2.
Wheel spin occurs after 0.6.

The disclosure makes a very good combination with a torque converter allowing the engine to reach speeds with max torque available.

The tank valve may be arranged to be controlled in such a way that only a part of the pressure is released from the tank during one or more pulsations. The benefit is that the engine response can be controlled with the pulse(s). During the release, the tank valve is arranged to perform one or more opening events, i.e., one or more pulsations. The pulsations correspond to the tank valve opening time and it has proven advantageously that at least one opening time is longer than 50 ms in order to protect the on/off controlling.

The tank valve may also be controlled in such a way that only a part of the pressure is released. The tank valve may be arranged to open only a part of max open area in order to control the engine response with the valve opening area.

BRIEF DESCRIPTION OF THE DRAWINGS

Embodiments according to the disclosure are described below with reference to the following drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
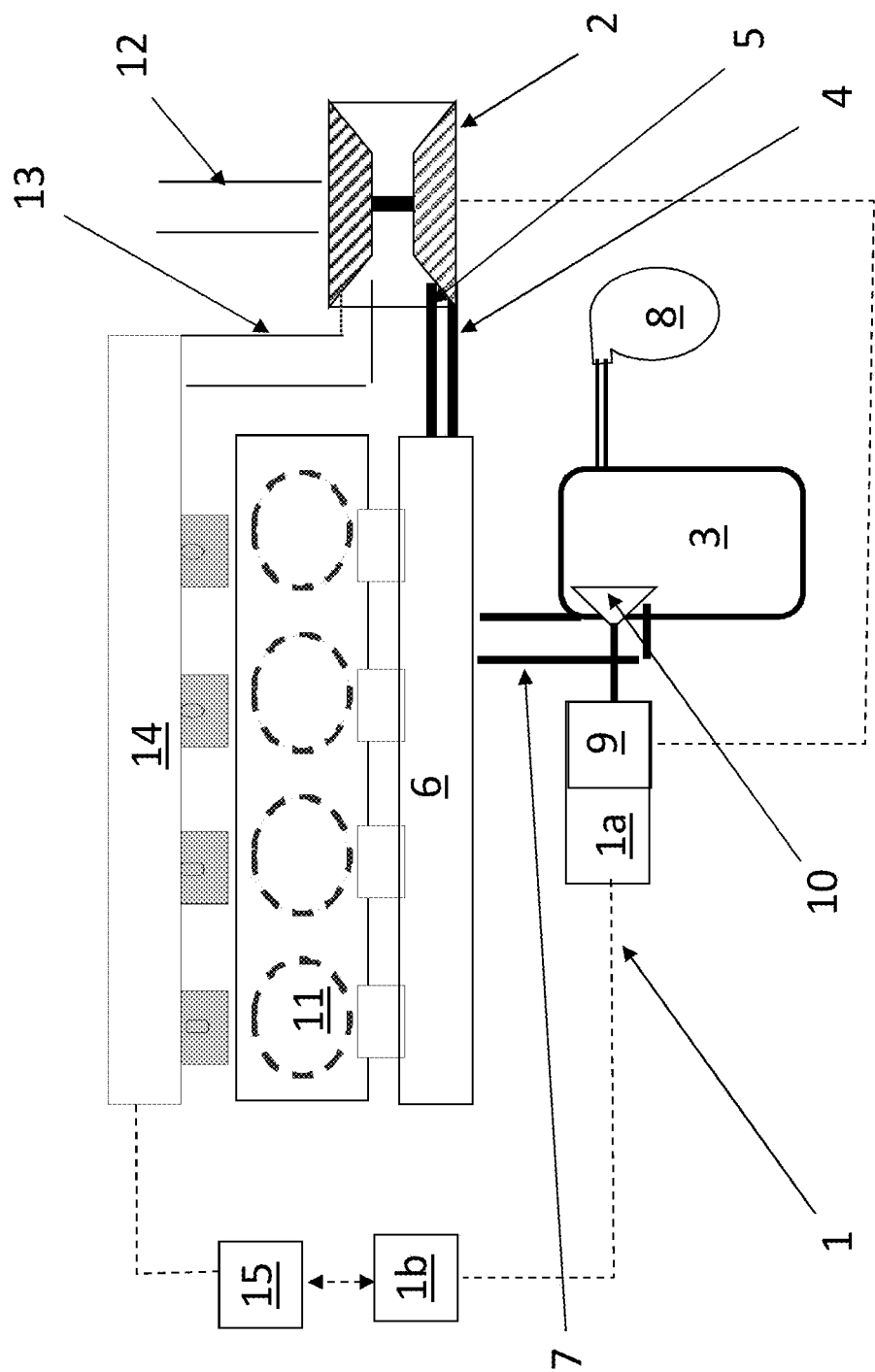
FIG. 1 schematically shows an engine with a turbocharger system according to the disclosure.

FIG. 1 schematically shows a turbocharger system 1 for a vehicle according to the disclosure. The system comprises a turbocharger 2, a tank 3 for compressed gas and an exhaust manifold conduit 4 being in fluid communication with an inlet 5 of the turbocharger 2. The tank 3 is in fluid communication with the manifold conduit 4. The tank 3 is arranged to push compressed gas into the manifold 6 and thereby the conduit 4 during a predetermined pulse duration time period for initial turbine and compressor spin up in the turbocharger 2.

The system 1 comprises a first control unit 1a and a load sensor 1b connected to the first control unit 1a. The load sensor 1b is arranged to sense a desired engine load from a driver of the vehicle. The first control unit 1a is arranged to estimate a desired change in engine load dependent on received input from the load sensor 1b. The first control unit 1a is arranged to estimate a desired turbocharger effect being dependent on the estimated desired change in engine load. The first control unit is arranged to control the tank 3 to discharge a predetermined pulse of compressed air dependent on the estimated desired turbocharger effect.

In FIG. 1, the load sensor 1b is arranged to sense position of an accelerator pedal 15. The predetermined position of the pedal 15 corresponds to a desired engine load and the change in position corresponds to a desired change in engine load estimated by the first control unit.

According to one example, the load sensor is arranged to sense the accelerator pedal 15 angle and/or accelerator pedal derivative. The first control unit 1a is then arranged to control the tank to discharge the predetermined pulse of compressed air depending on accelerator pedal 15 angle and/or accelerator pedal 15 derivative. The accelerator pedal 15 may be moved from one position to another within a first predetermined range of speed, i.e., an accelerator pedal 15 derivative, corresponding to a normal behavior and may be moved from one position to another within a second predetermined range of speed, i.e., an accelerator pedal derivative, corresponding to a non-normal behavior.

FIG. 1 shows that the system comprises an exhaust manifold 6 in fluid communication with the exhaust conduit 4. In FIG. 1 the tank 2 is connected to and in fluid communication with the exhaust manifold 6 via a pipe 7. The tank may however be connected directly to the exhaust conduit 4 via the pipe 7, or to any other part of the exhaust manifold system being in fluid communication with the turbocharger 2. In FIG. 1, the tank 3 is arranged to push compressed gas into the exhaust manifold 6 during a predetermined pulse duration time period for initial compressor spin up in the turbocharger 2.

FIG. 1 shows a tank 3 that is rechargeable by use of a compressor 8 for compressing air into the tank 3. The compressed gas may be air, exhaust gas or any other suitable gas.

FIG. 1 shows that the system comprises a second control unit 9 connected to a pulse regulation unit for regulating the pulse duration time period.

FIG. 1 shows that the system comprises a tank valve 10 connected to the tank 3, wherein the tank valve 10 is controlled by the second control unit 9.

The second control unit 9 is either connected to the first control unit 1a or part of the first control unit 1a. The first control 1a unit transmits a control signal to the second control unit 9 for controlling the pulse duration and the opening of the valve.

FIG. 1 shows the basic principle of the turbocharger 2, where the turbocharger 2 is driven by exhaust gas from an engine 11 and where the turbocharger compresses air from an air intake 12 into the engine 11 via an inlet 13 and inlet manifold 14 of the engine 11.

Figure 2:
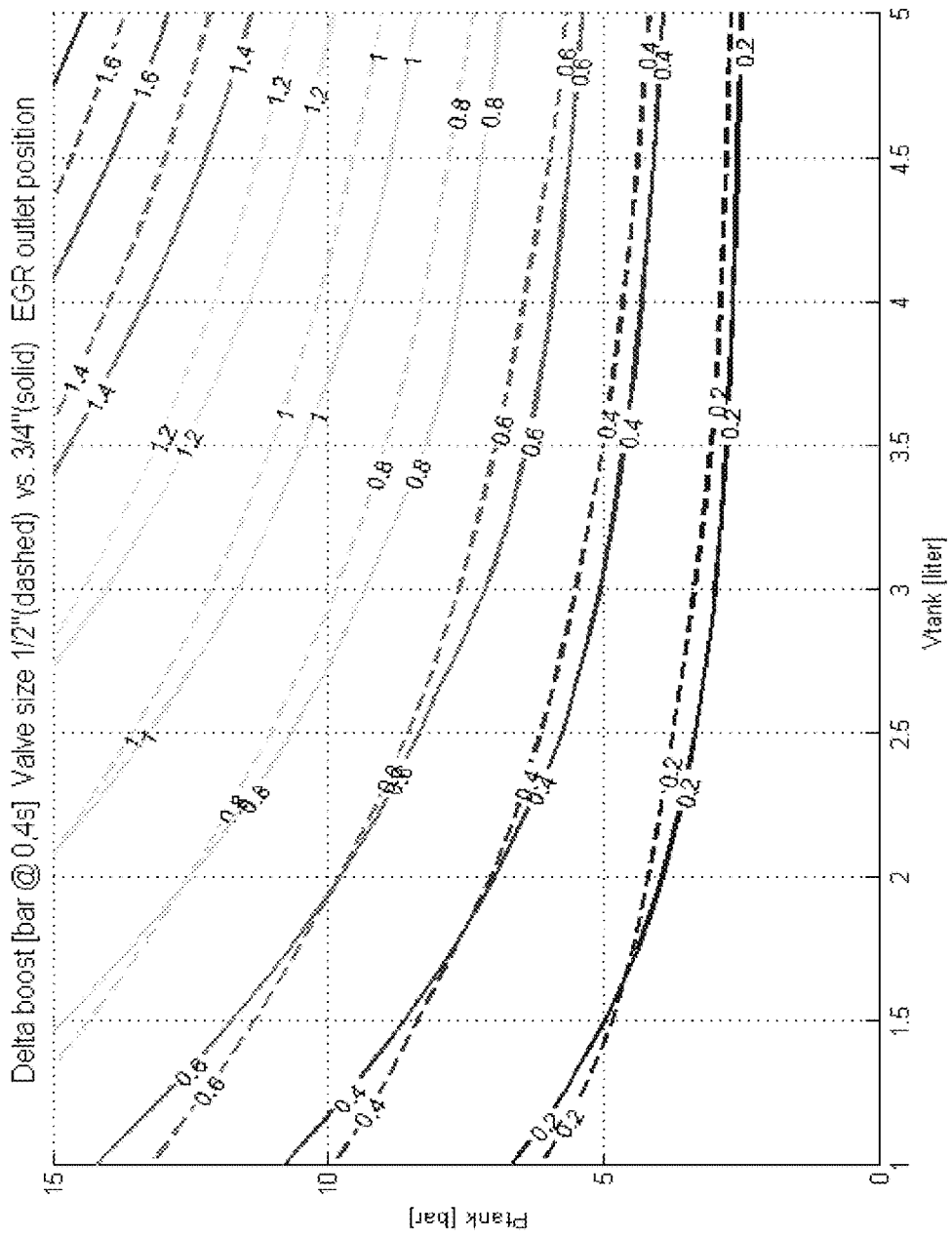
FIG. 2 shows a diagram over different tank volumes, tank pressure, pipe diameters and delta pressure during a predetermined time period.

FIG. 2 shows a diagram over different tank volumes, tank pressure, pipe diameters and boost pressure during a predetermined time period. FIG. 2 shows a diagram of an example where the tank valve has been open 0.4 seconds for different tank volumes (X-axis), tank pressures (Y-axis) and different sizes of the pipe. The dashed lines represent a pipe with a diameter of 12.7 mm and the solid lines represent a pipe with a diameter of 19.05 mm. In the diagram, the numbers connected to the different lines represent boost pressure for the given parameters. The boost pressure is the difference in pressure before and after the compressor 0.4 seconds after the pulse is activated.

Figure 3:
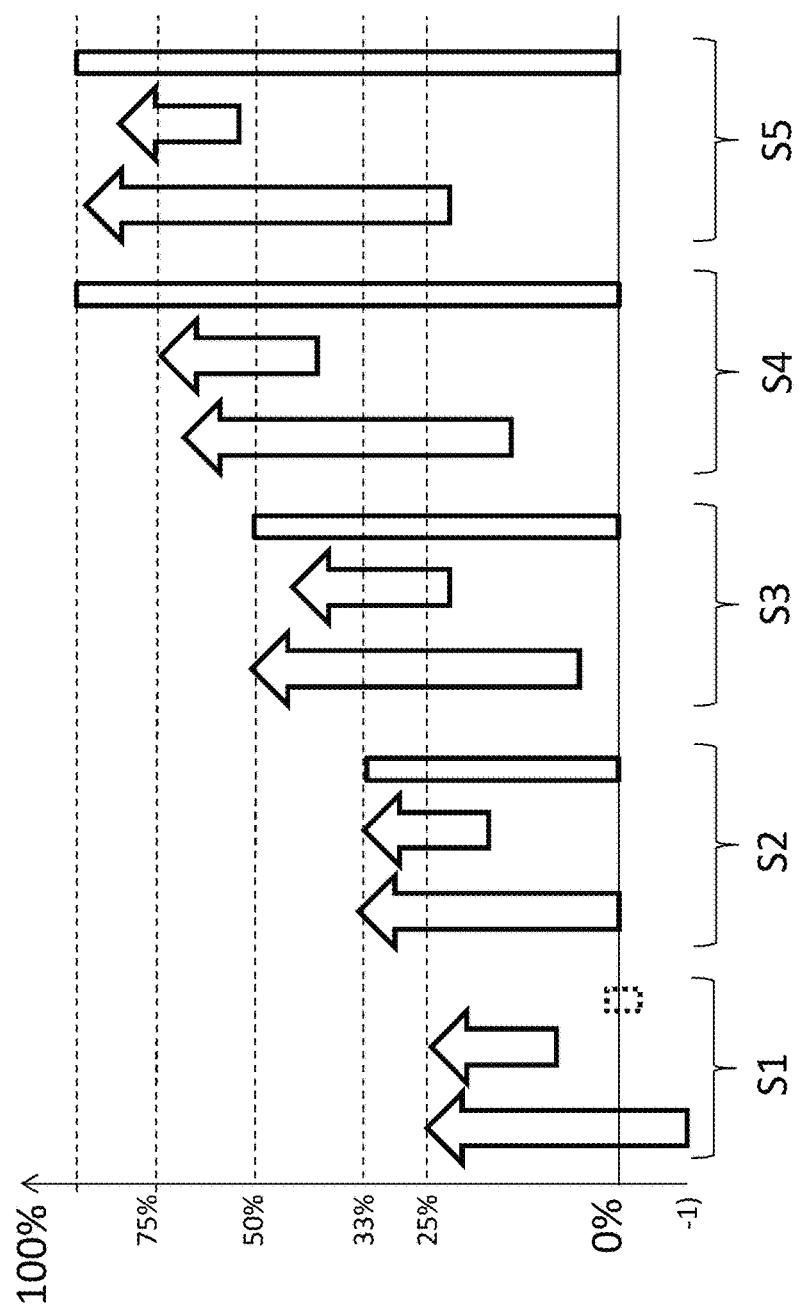
FIG. 3 shows a diagram over of an example of predetermined scenarios.

FIG. 3 shows a diagram over of an example of predetermined scenarios. It should be noted that the predetermined scenarios is dependent design parameters that can be tuned dependent on the desired behavior of the engine. The scenarios may be one, two or more dependent on how the designer of the engine chooses to control the pulse. In FIG. 3 the first control unit is arranged to control the tank dependent on predetermined scenarios of estimated desired change in engine load.

In FIG. 3, engine load and turbo effect are on the Z-axis and the different scenarios on the Y-axis. The engine load is depicted with arrows and ranges from below zero, being engine friction load, to 100% being maximum engine load. The turbo effect is depicted by rectangles and ranges from o to 100%.

The predetermined scenarios of estimated engine load is a design parameter depending on, for example, the desired behavior of the vehicle. It could be a race car feeling with maximum power for small changes in pedal movement or derivatives. It could be a function of a desire to have an engine with low energy consumption. There are numerous scenarios that could be in play and it is up to the designer to tune the engine, but below is one example of a scenario scheme that applies to the disclosure:

In a first scenario S1:

The first control unit is arranged to control the tank to not push compressed gas into the manifold conduit when there is no or low change in engine load. This is depicted with a dotted rectangle. The low estimated desired change in engine load corresponds to the turbocharger being not engaged or not further engaged. This may be the case when the engine operates within the suction envelope, for example during steady state or a very small change of desired increase of engine load. In FIG. 3 the example shows that any change in engine load leading to a maximum desired value of engine load not exceeding 25% of max engine load is considered as no or low estimated desired change in engine load.

In a second scenario S2:

The estimated desired change in engine load goes from no or low load to medium high engine load. The first control unit is then arranged to control the tank to push a first subset of the compressed gas into the manifold conduit. The first subset corresponds to the predetermined pulse of compressed air being discharged giving the estimated desired turbocharger effect. In FIG. 3 the example shows that any change in engine load from low to medium high leading to a maximum desired value of not exceeding 33% of max engine load is considered as medium high estimated desired change in engine load.

In a third scenario S3:

The estimated desired change in engine load goes from no or low load to high engine load. The first control unit is arranged to control the tank to push a second subset of the compressed gas into the manifold conduit. The second subset corresponds to the predetermined pulse of compressed air being discharged giving the estimated desired turbocharger effect. In FIG. 3 the example shows that any change in engine load from low to high leading to a maximum value of not exceeding 50% of max engine load is considered as high estimated desired change in engine load.

In a fourth scenario S4:

The estimated desired change in engine load goes from medium high to high engine load. The first control unit is arranged to control the tank to push a third subset of the compressed gas into the manifold conduit. The third subset corresponds to the predetermined pulse of compressed air being discharged giving the estimated desired turbocharger effect. In FIG. 3 the example shows that any change in engine load from medium high to high leading to a maximum value of not exceeding 75% of max engine load is considered as high estimated desired change in engine load.

In a fifth scenario S5:

The estimated desired change in engine load goes from any value below a predetermined threshold value to or above the threshold value. The threshold value being set as a value below a maximum value of engine load or to the maximum value of the engine load. In FIG. 3 the threshold value is set as 75% of the maximum engine load. The first control unit is arranged to control the tank to push a fourth subset of the compressed gas into the manifold conduit. The fourth subset corresponds to the predetermined pulse of compressed air being discharged giving the estimated desired turbocharger effect.

In FIG. 3, the fourth subset is equal to or greater than the third subset; and the third subset is equal to or greater than the second subset; and the second subset is equal to or greater than the first subset.

The fourth subset corresponds to a predetermined pulse of compressed air being discharged giving a maximum turbocharger effect; and the first, second and third subsets each correspond to a predetermined pulse effect of compressed air being discharged giving a turbocharger effect less than a maximum turbocharger effect.

However, it should be noted that threshold values in the example depends on a number of vehicle parameters such as engine parameter, gear box parameters, driver behavior and desired behavior of the vehicle dependent on driver behavior. The engine parameters could, for example, be engine volume, horse power, effect curve, exhaust pollution limitation and/or fuel consumption. The gear box parameters could, for example, be if the gear box is manual or automatic, when gear shift is designed to be done in connection to engine performance. The driver behavior could, for example, be how the accelerator pedal moves according to what have been discussed previously, if the driver uses a certain mode, e.g., sports mode, fuel economy mode etc., and/or GPS position giving altitude and/or road inclination. The desired vehicle behavior is a design parameter for the manufacturer, for example sporty, comfortable, fuel efficient, etc.

Furthermore, in the example it has been stated that any change in engine load going from one value to another leading to a maximum value of not exceeding a certain percentage of maximum engine load should give a subset of a predetermined pulse of compressed air. However, if the engine load is in the lower range of the total engine load range the vehicle normally runs at a low speed and there is less drag than at high speed and at high speed thus high energy load, the engine therefore normally does not need to produce as much energy in the lower ranger to increase engine speed than should the engine load be in the higher range, which in turn gives that the subset can be smaller in the lower range than in the higher for a given desired change in vehicle performance e.g., speed. Yet furthermore, there is a minimum threshold value for desired change in engine load, regardless of the range. For example, a too small desired change in engine load indicates that the driver is in no hurry and it is therefore not necessary to release the pulse in order to initiate the turobocharger. The minimum threshold value could also be different in different ranges, for example for the reasons stated above regarding the drag, where the minimum threshold value should be lower for the higher range than for the lower range. In one example, a change of 10-30% with reference to the initial value of the load and dependent on range is a minimum threshold value.

Figure 4:
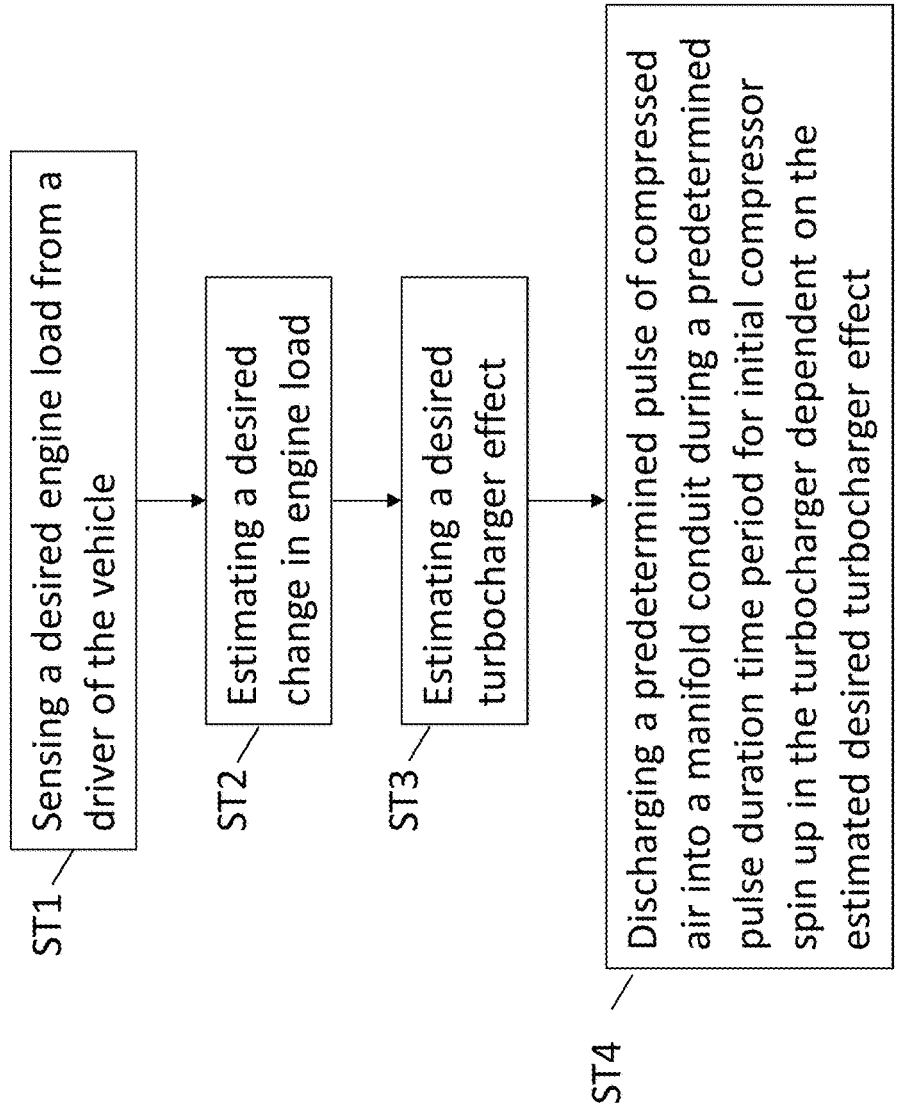
FIG. 4 schematically shows a flow chart of a method for controlling a turbocharger system 1 according to FIGS. 1-3.

FIG. 4 schematically shows a flow chart on a method for controlling a turbocharger system 1 according to FIGS. 1-3 comprising a turbocharger 2, a tank 3 for compressed gas and an exhaust manifold conduit 4 being in fluid communication with an inlet 5 of the turbocharger 2. The tank 3 is in fluid communication with the manifold conduit 4. The system comprises a first control unit 1a and a load sensor 1b connected to the first control unit 1a. The method comprises the steps of:

Box ST1:
the load sensor 1b sensing a desired engine load from a driver of the vehicle;
Box ST2:
the first control unit (1a) estimating a desired change in engine load dependent on received input from the load sensor 1b;
Box ST3:
the first control unit (1a) estimating a desired turbocharger effect being dependent on the estimated desired change in engine load;
Box ST4:
the first control unit (1a) controlling the tank (3) to discharge a predetermined pulse of compressed air into the manifold conduit (4) during a predetermined pulse duration time period for initial compressor spin up in the turbocharger (2) dependent on the estimated desired turbocharger effect.

Details of the steps have been discussed above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A turbocharger system for a vehicle, the system comprising:
a turbocharger;
an exhaust manifold conduit being in fluid communication with an inlet of the turbocharger;
a tank for compressed gas, the tank being in fluid communication with the exhaust manifold conduit and being arranged to push a pulse of compressed gas into the exhaust manifold conduit during a predetermined pulse duration time period for initial compressor spin up in the turbocharger;
a first control unit; and
a load sensor connected to the first control unit, the load sensor being arranged to sense a desired engine load from a driver of the vehicle;
wherein the first control unit is arranged to estimate a desired change in engine load dependent on received input from the load sensor, estimate a desired turbocharger effect dependent on the estimated desired change in engine load, and control the tank to discharge a predetermined pulse of compressed gas dependent on the estimated desired turbocharger effect, so that compressed gas is pushed into the exhaust manifold conduit during the predetermined pulse duration time period, and wherein the predetermined pulse duration time period is in the range of 0.1-0.3 seconds.

2. The turbocharger system according to claim 1 wherein the load sensor is arranged to sense position of an accelerator pedal, wherein a predetermined position of the accelerator pedal corresponds to a desired engine load and wherein change in position corresponds to a desired change in engine load estimated by the first control unit.

3. The turbocharger system according to claim 2 wherein the load sensor is arranged to sense an accelerator pedal angle or accelerator pedal derivative, the first control unit being arranged to control the tank to discharge the predetermined pulse of compressed gas depending on accelerator pedal angle or accelerator pedal derivative, wherein a higher angle or accelerator pedal derivative results in a larger pulse effect than a lower angle or accelerator pedal derivative.

4. The turbocharger system according to claim 1 wherein the load sensor is arranged to sense movement of an accelerator pedal, wherein a predetermined rate of change in movement of the accelerator pedal corresponds to a desired engine load estimated by the first control unit.

5. The turbocharger system according to claim 1 wherein the first control unit is arranged to control the tank dependent on predetermined scenarios of estimated desired change in engine load, and wherein the first control unit is arranged to control the tank to not push compressed gas into the manifold conduit when there is no or low estimated desired change in load.

6. The turbocharger system according to claim 5 wherein the low estimated desired change in engine load corresponds to the turbocharger being not engaged or not further engaged.

7. The turbocharger system according to claim 5 wherein the predetermined scenarios of estimated engine load comprise at least one of:
the estimated desired change in engine load going from no or low load to medium high load, wherein the first control unit is arranged to control the tank to push a first subset of the compressed gas into the exhaust manifold conduit, wherein the first subset corresponds to the predetermined pulse of compressed gas being discharged to give the estimated desired turbocharger effect;
the estimated desired change in engine load going from no or low load to high load, wherein the first control unit is arranged to control the tank to push a second subset of the compressed gas into the exhaust manifold conduit, wherein the second subset corresponds to the predetermined pulse of compressed gas being discharged to give the estimated desired turbocharger effect;
the estimated desired change in engine load going from medium high to high load, wherein the first control unit is arranged to control the tank to push a third subset of the compressed gas into the exhaust manifold conduit, wherein the third subset corresponds to the predetermined pulse of compressed gas being discharged to give the estimated desired turbocharger effect;
the estimated desired change in engine load going from any value below a predetermined threshold value to or above the threshold value, the threshold value being set as a value below a maximum value of engine load or to the maximum value of the engine load, wherein the first control unit is arranged to control the tank to push a fourth subset of the compressed gas into the exhaust manifold conduit, wherein the fourth subset corresponds to the predetermined pulse of compressed gas being discharged to give the estimated desired turbocharger effect.

8. The turbocharger system according to claim 7 wherein the predetermined scenarios of estimated engine load comprise all of the scenarios listed in claim 7, and wherein the fourth subset is equal to or greater than the third subset, and the third subset is equal to or greater than the second subset, and the second subset is equal to or greater than the first subset.

9. The turbocharger system according to claim 7 wherein the predetermined scenarios of estimated engine load comprise all of the scenarios listed in claim 7, wherein the fourth subset corresponds to a predetermined pulse of compressed gas being discharged to give a maximum turbocharger effect, and wherein the first, second and third subsets each correspond to a predetermined pulse of compressed gas being discharged to give a turbocharger effect less than a maximum turbocharger effect.

10. The turbocharger system according to claim 1 wherein the first control unit is arranged to exchange information with a gear sensor for sensing gear shift or gear position, wherein the first control unit is arranged to control the tank dependent on gear shifting.

11. The turbocharger system according to claim 1 wherein the first control unit is arranged to exchange information with an engine control unit, wherein an air/fuel equivalence ratio is determined to be below 1 when a scenario is detected for the tank to push compressed gas into the exhaust manifold conduit.

12. The system according to claim 11 wherein the air/fuel equivalence ratio is between 0.7-0.9 during 0.8-1.2 seconds and starting immediately before, directly or within 0.3 seconds from when the pulse is discharged.

13. The system according to claim 11 wherein the scenario is detected by the first control unit.

14. The system according to claim 11 wherein the fuel is gasoline.

15. The turbocharger system according to claim 1 wherein the predetermined pulse duration time period is in the range of 0.1-0.2 seconds.

16. A method for controlling a turbocharger system comprising a turbocharger, an exhaust manifold conduit in fluid communication with an inlet of the turbocharger, a tank for compressed gas in fluid communication with the exhaust manifold conduit, a first control unit and a load sensor connected to the first control unit, the method comprising:
the load sensor sensing a desired engine load from a driver of the vehicle;
the first control unit estimating a desired change in engine load dependent on received input from the load sensor;
the first control unit estimating a desired turbocharger effect being dependent on the estimated desired change in engine load; and
the first control unit controlling the tank to discharge a predetermined pulse of compressed gas into the exhaust manifold conduit during a predetermined pulse duration time period in the range of 0.1-0.3 seconds for initial compressor spin up in the turbocharger dependent on the estimated desired turbocharger effect.

17. The method according to claim 16 wherein the predetermined pulse duration time period is in the range of 0.1-0.2 seconds.

18. A turbocharger system for a vehicle, the system comprising;
a turbocharger;
an exhaust manifold conduit arrangeable in fluid communication with an inlet of the turbocharger;
a tank for compressed gas, the tank being arrangeable in fluid communication with the exhaust manifold conduit and configured to push a pulse of compressed gas into the exhaust manifold conduit during a predetermined pulse duration time period in the range of 0.1-0.3 seconds for initial compressor spin up in the turbocharger;
a first control unit; and
a load sensor connectable to the first control unit, the load sensor being arrangeable to sense a desired engine load from a driver of the vehicle;
wherein the first control unit is configured to estimate a desired change in engine load dependent on received input from the load sensor, estimate a desired turbocharger effect dependent on the estimated desired change in engine load, and control the tank to discharge a predetermined pulse of compressed gas during the predetermined pulse duration time period dependent on the estimated desired turbocharger effect.

19. The turbocharger system according to claim 18, wherein the predetermined pulse duration time period is in the range of 0.1-0.2 seconds.

* * * * *